United States Patent [19]
Calfat

[11] Patent Number: 5,885,667
[45] Date of Patent: Mar. 23, 1999

[54] METHOD OF PROTECTING A METALLIC WORKPIECE

[76] Inventor: Richard Calfat, 4615 - 107 Avenue, Edmonton, Alberta, Canada, T6A 1L8

[21] Appl. No.: 844,594

[22] Filed: Apr. 21, 1997

[51] Int. Cl.[6] ........................................................ H01F 1/00
[52] U.S. Cl. ........................... 427/547; 427/292; 427/300; 427/307; 427/327; 427/598
[58] Field of Search ........................................ 427/598, 547, 427/292, 300, 307, 327

[56] References Cited

U.S. PATENT DOCUMENTS 5,702,774 12/1997 Griffin et al. .......................... 427/598

OTHER PUBLICATIONS

Abstract of United States Patent No. 5,198,031 issued Mar. 30, 1993, Derstine, 2 pages.

*Primary Examiner*—Bernard Pianalto
*Attorney, Agent, or Firm*—Anthony R. Lambert

[57] ABSTRACT

A protective mask is formed of an annular magnetic sheet. Such a sheet may be used to cover annular surfaces to be protected. Adhesive is formed on one side of the sheet. In use, a fluid impervious sheet is adhered to the first side and across the central opening of the annular magnetic sheet. A method of protecting a metallic workpiece during treatment, the metallic workpiece having a portion to be protected during treatment, for example a raised face of a flanged pipe, the method comprising the steps of magnetically attaching a protective mask to the portion of the metallic workpiece to be protected, the protective mask being formed of an annular magnetic sheet and treating the workpiece, such as by painting or sandblasting. A method of protecting a pipe during transportation of the pipe, the pipe having a flanged pipe end and a pipe bore, the method comprising the steps of magnetically attaching a circular protective sheet to the flanged pipe end over the pipe bore; and transporting the pipe.

6 Claims, 1 Drawing Sheet

METHOD OF PROTECTING A METALLIC WORKPIECE

FIELD OF THE INVENTION

This invention relates to protective masks and a method of use thereof.

BACKGROUND OF THE INVENTION

During treatment of raised face flanges of pipes used in the oil industry, for example during painting and sandblasting, it is required to cover the annular raised face and the interior of the pipe. Conventionally, this is done by using masking tape. But this is time consuming. What is needed is an improved manner of protecting metallic workpieces during treatment.

In addition, during transportation of pipes used in the oil industry, the pipe ends must be covered. Conventionally, this is done by placing plastic caps over the ends of the pipes. These plastic caps are hard to get on and off, and are prone to cracking. What is required is an improved cap for pipes.

SUMMARY OF THE INVENTION

There is therefore provided in accordance with one aspect of the invention, a protective mask formed of an annular magnetic sheet. Such a sheet may be used to cover annular surfaces to be protected. In the case of protection of portions of a workpiece that are solid areas (without holes, as for example a circular portion of a workpiece), adhesive is formed on one side of the sheet. In use, a fluid impervious sheet is adhered to the first side and across the central opening of the annular magnetic sheet. The sheet's characteristics may be chosen to meet the requirements imposed by the manner in which the workpiece is to be treated.

In a further aspect of the invention, there is provided a method of protecting a metallic workpiece during treatment, the metallic workpiece having a portion to be protected during treatment, for example a raised or grooved face of a flanged pipe, the method comprising the steps of magnetically attaching a protective mask to the portion of the metallic workpiece to be protected, the protective mask being formed of a fluid impervious sheet having a magnetic portion, preferably an annular portion, adjacent its perimeter, and treating the workpiece, such as by painting or sandblasting.

In a further aspect of the invention, there is provided a method of protecting a pipe during transportation of the pipe, the pipe having a flanged pipe end and a pipe bore, the method comprising the steps of magnetically attaching a circular protective sheet to the flanged pipe end over the pipe bore; and transporting the pipe. In preferred aspects of the invention, the circular protective sheet may comprise a circular magnetic sheet or an annular magnetic sheet having a central opening and first and second sides, adhesive on a first side of the annular magnetic sheet and a fluid impervious sheet adhered to the adhesive and covering the central opening.

These and other aspects of the invention are described in the detailed description and claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
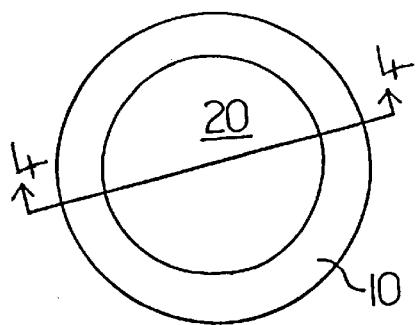
FIG. 1 is plan view of a protective mask according to the invention.
Figure 2:
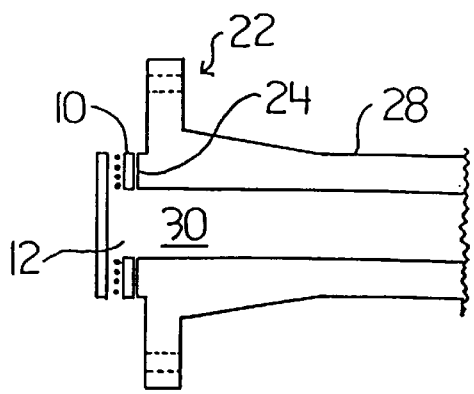
FIG. 2 is a side section of the protective mask of FIG. 1 in place on a workpiece prior to treatment.
Figure 4:
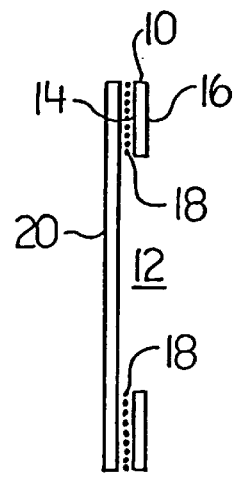
FIG. 4 is a section across a diameter of the protective mask of FIG. 1.

Referring to FIGS. 1, 2 and 4, a protective mask is formed of an annular magnetic sheet 10 having a central opening 12 and a first side 14 and a second sides 16. Various thicknesses of magnetic sheet may be used. The material is commonly commercially available and comes in large sheets that may be die cut to the annular shape required. Magnetic strength of the sheet must be sufficient to hold the sheet on a workpiece during treatment of the workpiece, and may be 0.020 (45lb/sq ft strength) to 0.060 (100 lb/sq ft), preferably 0.030 for use in treatment of flanged pipe ends used in the oil industry.

Adhesive 18 is adhered to the first side 14 and a fluid impervious sheet 20 is adhered to the first side 14 by the adhesive 18 so that the sheet 20 extends across the central opening 12. The sheet 20 is preferably circular, and may be made of a polymer plastic such as Mylar (tm) for use in treating the workpiece by painting or an abrasion resistant material such as tin for use during treating the workpiece by sandblasting. If the fluid impervious sheet 20 is itself a magnetizable material, the adhesive may be omitted and the fluid impervious sheet 20 may be held on the annular sheet 10 by magnetic forces. The annular magnetic sheet 10 may be used in a method of protecting a metallic workpiece 22 during treatment, in which the metallic workpiece 22 has a portion 24 to be protected during treatment. In the example shown, the metallic workpiece 22 is a flanged pipe end and the portion 24 to be protected is a raised face of the flange. The invention has equal applicability to other workpieces and in particular grooved faces of flanged pipe ends. The method of use comprises magnetically attaching the protective mask 10 to the metallic workpiece 22 and treating the workpiece, such as by painting or sandblasting.

Figure 3:
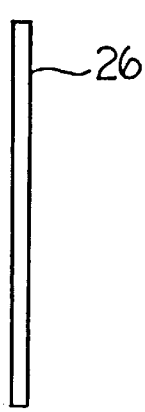
FIG. 3 is a side section of an alternative embodiment of a protective mask according to the invention.

Referring to FIGS. 2 and 3, a circular magnetic sheet 26 may be used to protect a pipe 28 during transportation of the pipe 28. The pipe 28 has a flanged pipe end 22 and a pipe bore 30. The method comprises magnetically attaching the circular magnetic sheet 26 to the flanged pipe end 22 over the pipe bore 30 and transporting the pipe. Instead of the circular magnetic sheet 26, the annular magnetic sheet 10 may be used as shown in FIG. 2

Use of the annular magnetic sheet for protecting circular portions of metallic workpieces is preferred over the solid circular magnetic sheet due to the expense of the magnetic material. The magnetic material is expensive in relation to the non-magnetic material. In addition, annular sheets of various diameters may be cut from a single sheet, one inside another. While it is preferred that an annular magnetic portion be used, the sheet 20 may be secured by independent magnetic strips spaced around the perimeter of the sheet 20, but this complicates the design and makes it harder to secure the sheet properly to the workpiece. Alternatively, the sheet 20 may be formed with a perimeter impregnated with magnetic material adjacent the perimeter. Again, this complicates manufacture and is not preferred.

While a preferred implementation has been described, the invention is not limited to the exemplary features described.

A person skilled in the art will appreciate that immaterial variations are intended to be encompassed within the scope of the invention.

The embodiments of the invention in which an exclusive property or privilege is claimed are defined as follows:

1. A method of protecting a pipe during transportation of the pipe, the pipe having a flanged pipe end and a pipe bore, the method comprising the steps of:

magnetically attaching a circular protective sheet to the flanged pipe end over the pipe bore; and transporting the pipe.

2. The method of claim 1 in which the circular protective mask comprises a circular magnetic sheet.

3. The method of claim 1 in which the circular protective sheet comprises an annular magnetic sheet having a central opening and first and second sides, adhesive on a first side of the annular magnetic sheet and a fluid impervious sheet adhered to the adhesive and covering the central opening.

4. A method of protecting a circular metallic workpiece during treatment, the metallic workpiece having a portion to be protected during treatment, the method comprising the steps of:

magnetically attaching a protective mask to the portion of the metallic workpiece to be protected, the protective mask comprising an annular magnetic sheet having a central opening, adhesive on a first side of the annular magnetic sheet and a fluid impervious sheet adhered to the adhesive and covering the central opening; and treating the workpiece.

5. The method of claim 4 in which the workpiece is a flanged end of a pipe having a raised or grooved face, and the protective mask is magnetically attached to the raised face.

6. The method of claim 4 in which treating the workpiece comprises treating the workpiece with a treatment selected from the group consisting of painting and sandblasting the workpiece.

\* \* \* \* \*